(12) United States Patent
Erdler

(10) Patent No.: US 11,898,889 B2
(45) Date of Patent: Feb. 13, 2024

(54) PRESSURE AND FLOW RATE MEASURING CELL

(71) Applicant: Siemens Aktiengesellschaft, Munich (DE)

(72) Inventor: Gilbert Alexander Erdler, Karlsruhe (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 297 days.

(21) Appl. No.: 17/276,891

(22) PCT Filed: Sep. 18, 2019

(86) PCT No.: PCT/EP2019/074970
§ 371 (c)(1),
(2) Date: Mar. 17, 2021

(87) PCT Pub. No.: WO2020/058315
PCT Pub. Date: Mar. 26, 2020

(65) Prior Publication Data
US 2021/0348956 A1    Nov. 11, 2021

(30) Foreign Application Priority Data
Sep. 18, 2018 (DE) .......................... 102018215851.7

(51) Int. Cl.
*G01L 9/00* (2006.01)
*G01F 1/38* (2006.01)
*G01L 13/02* (2006.01)

(52) U.S. Cl.
CPC ............ *G01F 1/383* (2013.01); *G01L 9/0048* (2013.01); *G01L 13/026* (2013.01)

(58) Field of Classification Search
None
See application file for complete search history.

(56) References Cited

U.S. PATENT DOCUMENTS 4,798,084 A   1/1989   Takahashi et al.
4,833,920 A   5/1989   Knecht et al.
(Continued)

FOREIGN PATENT DOCUMENTS

CN    1444018       9/2003
CN    104132695    11/2014
(Continued)

OTHER PUBLICATIONS

PCT International Search Report dated Dec. 12, 2019 based on PCT/EP2019/074970 filed Sep. 18, 2019.

*Primary Examiner* — Brandi N Hopkins
*Assistant Examiner* — Nigel H Plumb
(74) *Attorney, Agent, or Firm* — Cozen O'Connor

(57) ABSTRACT

A pressure measuring cell or flow rate measuring cell includes a pipe piece in which either a membrane to which a pressure that is to be measured is applied or an orifice plate is arranged in the cross-section through which a fluid flows, wherein the membrane or orifice plate and the pipe piece are formed together and interconnected via a solid-body joint, where a sensor is arranged outside the pipe piece near the solid-body joint or is accessible from this side, a tubular carrier part diverts forces past the solid-body joint when the pressure or flow rate measurement cell is being installed, and where the tubular carrier part has an inner diameter that is greater than the outer diameter of the pipe piece and has a wall in its cross section with a central circular opening, into which the pipe piece shortened to the thickness of the wall is inserted.

12 Claims, 3 Drawing Sheets

(56) References Cited

U.S. PATENT DOCUMENTS

| | | | |
|---|---|---|---|
| 6,311,560 B1 | 11/2001 | Stundl | |
| 2003/0172744 A1 | 9/2003 | Matsuzawa et al. | |
| 2011/0167918 A1 | 7/2011 | Dukart et al. | |
| 2017/0254684 A1 | 9/2017 | Betz | |
| 2017/0328796 A1 | 11/2017 | Abousaleh | |
| 2018/0238722 A1* | 8/2018 | Erdler | G01F 1/383 |
| 2018/0245999 A1* | 8/2018 | Erdler | G01L 13/025 |
| 2018/0252605 A1 | 9/2018 | Klehr | |
| 2020/0309628 A1 | 10/2020 | Ens et al. | |

FOREIGN PATENT DOCUMENTS

| | | |
|---|---|---|
| CN | 106796129 | 5/2017 |
| CN | 107356363 | 11/2017 |
| DE | 19738704 | 3/1999 |
| DE | 102008002671 | 12/2009 |
| DE | 102015216624 | 3/2017 |
| DE | 102015216626 | 3/2017 |
| DE | 102015223784 | 6/2017 |
| DE | 102017202896 | 8/2018 |
| JP | S60122319 | 6/1985 |

\* cited by examiner

PRESSURE AND FLOW RATE MEASURING CELL

CROSS-REFERENCE TO RELATED APPLICATIONS

This is a U.S. national stage of application No. PCT/EP2019/074970 filed 18 Sep. 2019. Priority is claimed on European Application No. 10 2018 215 851.7 filed 18 Sep. 2018, the content of which is incorporated herein by reference in its entirety.

BACKGROUND OF THE INVENTION

1. Field of the Invention

The invention relates to a pressure or flow rate measuring cell with a pipe piece, in which either a resiliently deflectable diaphragm to which a pressure to be measured is applied or a resiliently deflectable measuring orifice, is arranged in the cross-section of the pipe piece through which a fluid flows, where the diaphragm or measuring orifice and the pipe piece are formed in one piece from a single material and are connected to one another via a solid-state joint, and where at least one sensor that records a deflection of the diaphragm or measuring orifice is arranged in the region of the solid-state joint on the outer side of the pipe piece or such that they can be accessed from this side.

2. Description of the Related Art

DE 10 2015 216 626 A1 discloses a pressure measuring cell of in which, in order to implement the solid-state joint, the diaphragm has a lower thickness in its peripheral region than in its central region. Additionally, the diaphragm transitions into the pipe piece on each of the sides via a gutter groove. The outer wall of the pipe piece contains a recess for reducing the pipe thickness in a region lying opposite the diaphragm. A gap may be provided in the recess that extends centrally in relation to the diaphragm and protrudes partially into the diaphragm. The sensors are formed as strain sensors (strain gauges) and are arranged in the recess of the pipe piece and/or on the inner walls of the gap, opposite the gutter groove.

DE 10 2017 202 896 A1 discloses a flow rate measuring cell that operates in accordance with the differential pressure method and differs from the above-described conventional pressure measuring cell by providing a measuring orifice through which a fluid flows instead of the diaphragm.

In the conventional pressure measuring cell disclosed in DE 10 2015 216 624 A1, the diaphragm has a high flexural rigidity in the central region and is spring-mounted in the axial direction in the edge region in the pipe piece, where the spring mounting is implemented by a suspension with two limbs that extend substantially in parallel with the plane of the diaphragm and have rotational symmetry in relation to the pipe axis. In order to form the two limbs, the end face of the diaphragm may contain a groove that protrudes into the diaphragm in the radial direction. A displacement of the diaphragm that is dependent upon the pressure to be measured may occurs by way of optical measurement via lasers, capacitive measurement using suitably attached electrodes, magnetic or ultrasonic measurement or with the aid of strain transducers that are attached to the two inner sides of the limbs.

DE 10 2015 223 784 A1 discloses a pressure measuring cell that differs from the above-described conventional pressure measuring cell by providing a bar-shaped transfer device that extends between the two limbs and at least partially projects beyond the outer side of the pipe piece in the radial direction that indicates the axial displacement of the diaphragm and the device for recording the displacement of the diaphragm is arranged on the outer side of the pipe piece.

DE 10 2008 002 671 A1 discloses a pressure sensor arrangement with a pipe and a separating diaphragm arranged therein, which are manufactured in one piece from a single material. On its peripheral side, opposite the separating diaphragm, the pipe has a recess, in the region of which the pipe wall uses its reduced thickness to serve as a side wall diaphragm. A pressure differential applied at the separating diaphragm leads to the deformation thereof. As the separating diaphragm strikes the side wall diaphragm in a T-shaped manner, no deformation occurs at this location due to the high rigidity, meaning that the deformation of the separating diaphragm is transferred to the side wall diaphragm, where it is recorded using strain transducers arranged in the recess.

DE 197 38 704 A1 shows a differential pressure measuring cell that is closed on both sides by external pressure caps. To this end, the pressure caps are braced against the housing in a sealing manner with the aid of clamping pins. Each of the two pressure caps contains a pressure supply opening, via which the pressures, of which the differential is to be measured, are supplied. In the case of a flow rate measuring cell of the kind mentioned in the introduction, the sensitive solid-state joint comes to lie precisely in a force fit with the pressure cap, so that the high torque of the screwing may lead to a bracing of the cell, which in turn causes an offset displacement of the zero point.

The problem also occurs when a flow rate measuring cell of the kind mentioned in the introduction is mounted between two flanges as part of a pipeline.

SUMMARY OF THE INVENTION

In view of the foregoing, it is an object of the invention to provide a pressure or flow rate measuring cell that solves the problems associated with conventional pressure or flow rate measuring cells.

This and other objects and advantages are achieved in accordance with the invention by a pressure or flow rate measuring cell that has a pipe-shaped carrier part, the internal diameter of which is greater than the external diameter of the pipe piece and which, in its cross-section, has a wall with a central circular opening, into which the pipe piece that has been shortened to the thickness of the wall is inserted, where the pipe-shaped carrier part projects beyond the pipe piece in the axial direction on both sides.

In the case of a differential pressure measuring arrangement that contains the pressure measuring cell in accordance with the invention, the pipe-shaped carrier part is closed at both of its ends by outer pressure caps (process interface caps) that contain pressure supply openings and are braced against the carrier part in a sealing manner with the aid of clamping pins.

In the case of a flow rate measuring arrangement that contains the flow rate measuring cell in accordance with the invention, the pipe-shaped carrier part is installed with both of its ends in a pipeline that guides the fluid. For this purpose, the ends of the pipe-shaped carrier part may be provided with process flanges.

In both cases, the clamping or mounting forces are absorbed by the pipe-shaped carrier part and are conducted around the solid-state joint of the pressure or flow rate measuring cell, which achieves a considerably higher performance (zero point stability).

The pipe piece with the diaphragm or measuring orifice may be fixed in the opening of the wall in different manners, for example, by interference fit and/or adhesive bond, where the pipe piece is preferably welded to the wall along the circular opening.

In order to guide electrical contact lines from the sensor(s) in the region of the solid-state joint toward the outside, the inner wall of the circular opening preferably contains a circumferential groove, into which a borehole opens that extends transversely through the pipe-shaped carrier part and the wall from the outside.

The outer wall of the pipe piece may also contain a circumferential groove for the same purpose. This preferably has a width such that the pipe piece, at each of its ends, forms a collar-shaped flange that acts as a secure weld seam when welding the pipe piece in the wall.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

On the basis of the drawings, which show exemplary embodiments of the invention in a simplified schematic representation, the invention as well as embodiments and advantages are explained below in further detail, in which.

DETAILED DESCRIPTION OF THE EXEMPLARY EMBODIMENTS

Figure 1:
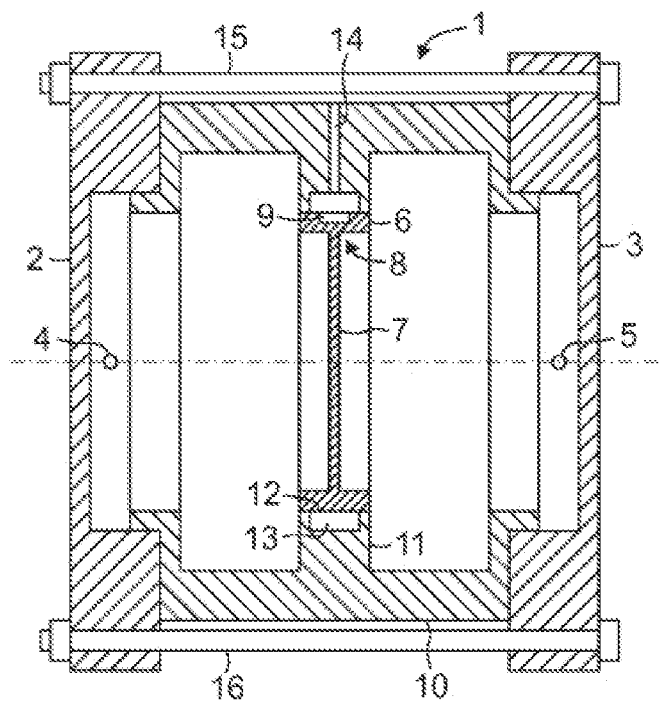
FIG. 1 shows an exemplary embodiment of the pressure measuring arrangement in accordance with the invention in a longitudinal section.

In the figures, the same parts are provided with the same reference characters.

FIG. 1 shows a longitudinal section of a differential pressure measuring arrangement with a pressure measuring cell 1, which is closed on both sides by external pressure caps 2, 3. Each of the two pressure caps 2, 3 contains a pressure supply opening 4, 5, via which the pressures, of which the differential is to be measured, are supplied.

The pressure measuring cell 1 contains a pipe piece 6, in the cross-section of which a resiliently deflectable diaphragm 7, to which the differential pressure to be measured is applied, is arranged. The diaphragm 7 and the pipe piece 6 are embodied in one piece from a single material, e.g., steel, and are connected to one another via a solid-state joint 8. In order to form the solid-state joint 8, the pipe piece 6, on its peripheral side, contains a recess 9 in a region lying opposite the diaphragm 7 that reduces the wall thickness of the pipe piece 6 on both sides of the diaphragm 7. As shown here, the recess 9 may be formed as local or circumferential around the pipe piece 6. Sensors (not shown) that record a deflection of the diaphragm 7 are arranged here on the solid-state joint 8, in the recess 9 or accessible therefrom.

The pipe piece 6 with the diaphragm 7 is arranged in a pipe-shaped carrier part 10, the internal diameter of which is greater than the external diameter of the pipe piece 6 and which, in its cross-section, has a wall 11 with a central circular opening 12. The pipe piece 6 is inserted into this opening 12 and in doing so is connected to the wall 11 in a fixed manner. In particular, the pipe piece 6 may be welded to the wall 11 along the circular opening 12. In order to guide electrical contact lines from the sensors in the region of the solid-state joint 8 toward the outside, the inner wall of the circular opening 12 contains a circumferential groove 13, into which a borehole 14 opens that extends axially through the pipe-shaped carrier part 10 and the wall 11 from the outside. The length of the pipe piece 6 corresponds to the thickness of the wall 11, so that the pipe piece 6 closes flush with the wall 11 at both of its ends and the pipe-shaped carrier part 10 projects beyond the pipe piece 6 in the axial direction on both sides.

The pressure caps 2, 3 abut the ends of the pipe-shaped carrier part 10 and are braced against the carrier part 10 in a sealing manner with the aid of clamping pins 15, 16. The clamping forces are completely absorbed by the pipe-shaped carrier part 10 and are conducted around the solid-state joint 6 of the pressure measuring cell 1.

Figure 2:
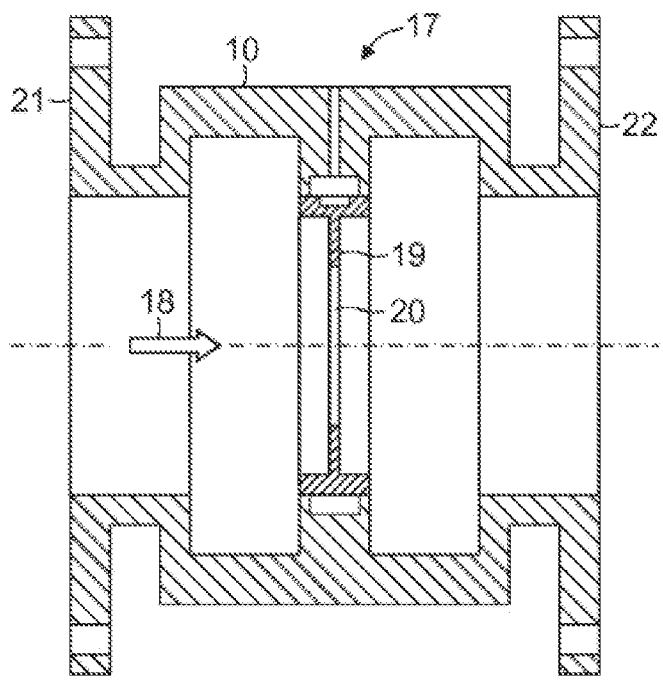
FIG. 2 shows an exemplary embodiment of the flow rate measuring arrangement in accordance with the invention in a longitudinal section.

FIG. 2 shows a longitudinal section of a flow rate measuring arrangement with a flow rate measuring cell 17, which differs from the pressure measuring cell 1 shown in FIG. 1 in that, instead of the diaphragm 7, a measuring orifice 19 through which a fluid 18 flows is provided. The measuring orifice 19 has an orifice opening 20 in its center, by way of which the flow cross-section is narrowed. The flowing fluid 18 therefore causes a pressure drop via the measuring orifice 19, so that it is deformed and deflected. The pipe-shaped carrier part 10 is provided with process flanges 21, 22 at both of its ends, in order to install the flow rate measuring cell 17 in a pipeline (not shown here) that guides the fluid 18.

The following FIGS. 3 to 6 show different exemplary embodiments of the pressure or flow rate measuring cell 1, 17 in accordance with the invention as a detail in the region of the solid-state joint 6.

Figure 3:
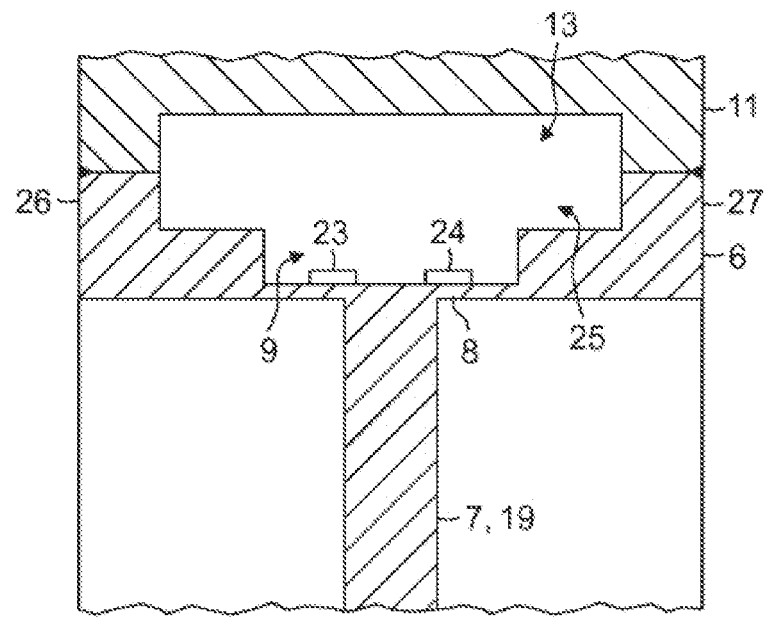
FIG. 3 shows a detail of a first exemplary embodiment of the pressure or flow rate measuring cell in accordance with the invention.

In the example shown in FIG. 3, the solid-state joint 8 is formed by the wall thickness of the pipe piece 6 being reduced on both sides of the diaphragm 7 or measuring orifice 19 by way of the recess 9 contained on its peripheral side. A deflection of the diaphragm 7 or measuring orifice 19 that strikes the pipe piece 6 in a T-shaped manner is transferred to the wall of the pipe piece 6 with reduced thickness, where it is recorded with the aid of strain sensors 23, 24. The outer wall of the pipe piece 6 contains a circumferential groove 25 in addition to the local recess 9, so that the pipe piece 6, at its ends, forms collar-shaped flanges 26, 27 at which the pipe piece 6 is welded to the wall 11.

Figure 4:
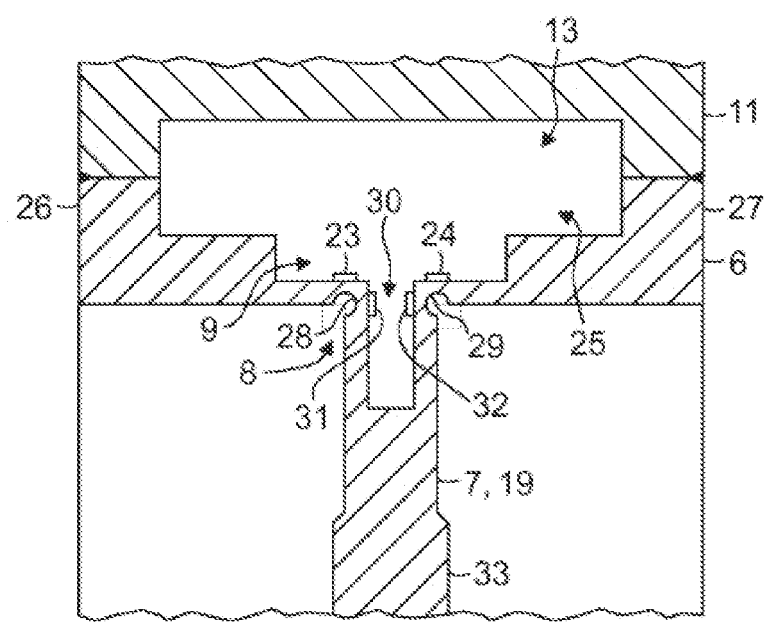
FIG. 4 shows a detail of a second exemplary embodiment of the pressure or flow rate measuring cell in accordance with the invention.

The exemplary embodiment shown in FIG. 4 differs from the embodiment shown in FIG. 3 in that, at the point where the diaphragm 7 or measuring orifice 19 strikes the pipe piece 6 in a T-shaped manner and transitions into it, a gutter groove 28, 29 is worked into the wall of the pipe piece 6 on both sides of the diaphragm 7 or measuring orifice 19 in each case and, as shown here, but preferably also not necessarily, is also worked into the diaphragm 7 or measuring orifice 19. The strain sensors 23, 24 are arranged in the recess 9 on the peripheral side of the pipe piece 6 opposite the gutter grooves 28, 29. A gap 30 extends out from the bottom of the recess 9 in the pipe piece 6 into the diaphragm 7 or measuring orifice 19, in which gap 30 further strain sensors 31, 32 may be arranged opposite the gutter grooves 28, 29.

As FIG. 4 shows, the diaphragm 7 or measuring orifice 19 have a higher thickness in their central region 33 than in their outer region, via which they are connected to the pipe piece 6.

Figure 5:
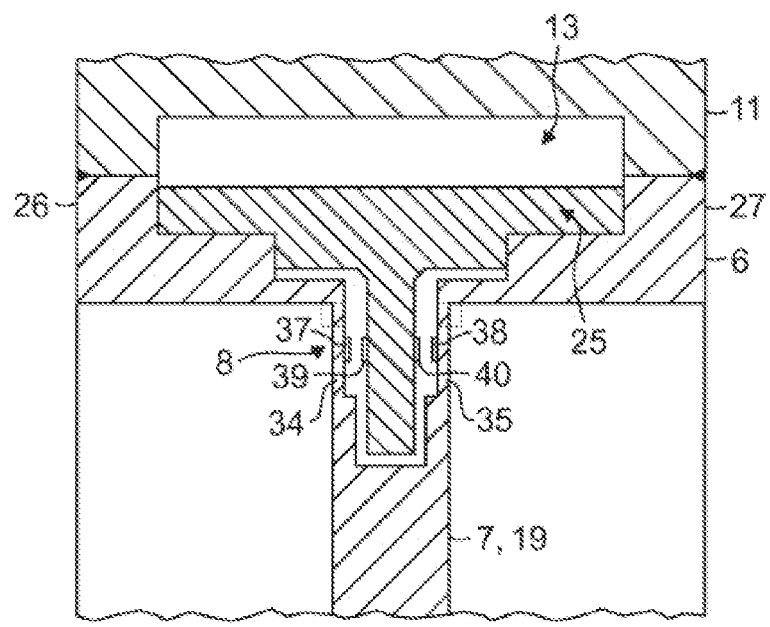
FIG. 5 shows a detail of a third exemplary embodiment of the pressure or flow rate measuring cell in accordance with the invention.
Figure 6:
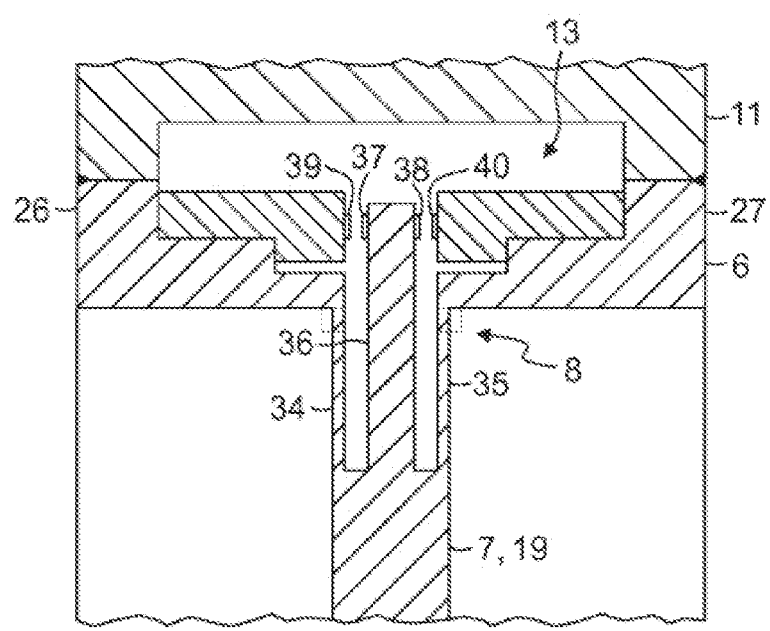
FIG. 6 shows a detail of a fourth exemplary embodiment of the pressure or flow rate measuring cell in accordance with the invention.

In the exemplary embodiments shown in FIGS. 5 and 6, the diaphragm 7 or measuring orifice 19 is spring-mounted in the axial direction in the edge region in the pipe piece 6, where the spring mounting is implemented by a suspension with two limbs 34, 35 that extend substantially in parallel with the plane of the diaphragm 7 or measuring orifice 19 and have rotational symmetry in relation to the pipe axis. Arranged on the limbs 34, 35 (FIG. 5) or alternatively on a lever 36 running in a clockhand-like manner between the two limbs (FIG. 6) are electrodes 37, 38 that form capacitive sensors for recording the deflection of the diaphragm 7 or measuring orifice 19 with fixed-position electrodes 39, 40 that lie opposite.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A pressure measuring cell comprising:
a pipe piece through which a fluid flows having a resiliently deflectable diaphragm to which a pressure to be measured is applied arranged in a cross-section of the pipe; and
a pipe-shaped carrier part having an internal diameter which is greater than an external diameter of the pipe piece and having a wall with a central circular opening arranged in a cross-section of the pipe-shaped carrier part, into which the pipe piece shortened to a thickness of the wall is inserted, the pipe-shaped carrier part projecting beyond the pipe piece in an axial direction on both sides;
wherein the resiliently deflectable diaphragm and the pipe piece and are formed in one piece from a single material and are connected to one another via a solid-state joint; and
wherein at least one sensor which records a deflection of the resiliently deflectable diaphragm are arranged one of (i) in a region of the solid-state joint on an outer side of the pipe piece and (ii) such that said at least one sensor is accessible from said outer side of the pipe piece.

2. The pressure or flow rate measuring cell as claimed in claim 1, wherein the pipe piece is welded to the wall along the central circular opening.

3. The pressure or flow rate measuring cell as claimed in claim 1, wherein the inner wall of the central circular opening contains a circumferential groove, into which a borehole opens which extends transversely through the pipe-shaped carrier part and the wall externally.

4. The pressure or flow rate measuring cell as claimed in claim 2, wherein the inner wall of the central circular opening contains a circumferential groove, into which a borehole opens which extends transversely through the pipe-shaped carrier part and the wall externally.

5. The pressure or flow rate measuring cell as claimed in claim 1, wherein an outer wall of the pipe piece contains a circumferential groove have a width such that the pipe piece forms a collar-shaped flange at ends of the pipe.

6. A differential pressure measuring arrangement having the pressure measuring cell as claimed in claim 1, wherein the pipe-shaped carrier part is closed at both ends of the pipe-shaped carrier part by outer pressure caps which contain pressure supply openings and which are braced against the pipe-shaped carrier part in a sealing manner aided by clamping pins.

7. A flow rate measuring cell comprising:
a pipe piece through which a fluid flows having a resiliently deflectable measuring orifice arranged in a cross-section of the pipe; and
a pipe-shaped carrier part having an internal diameter which is greater than an external diameter of the pipe piece and having a wall with a central circular opening arranged in a cross-section of the pipe-shaped carrier part, into which the pipe piece shortened to a thickness of the wall is inserted, the pipe-shaped carrier part projecting beyond the pipe piece in an axial direction on both sides;
wherein the resiliently deflectable measuring orifice and the pipe piece are formed in one piece from a single material and are connected to one another via a solid-state joint; and
wherein at least one sensor which records a deflection of the resiliently deflectable measuring orifice are arranged one of (i) in a region of the solid-state joint on an outer side of the pipe piece and (ii) such that said at least one sensor is accessible from said outer side of the pipe piece.

8. The flow rate measuring cell as claimed in claim 7, wherein the pipe piece is welded to the wall along the central circular opening.

9. The flow rate measuring cell as claimed in claim 7, wherein the inner wall of the central circular opening contains a circumferential groove, into which a borehole opens which extends transversely through the pipe-shaped carrier part and the wall externally.

10. The flow rate measuring cell as claimed in claim 8, wherein the inner wall of the central circular opening contains a circumferential groove, into which a borehole opens which extends transversely through the pipe-shaped carrier part and the wall externally.

11. The flow rate measuring cell as claimed in claim 7, wherein an outer wall of the pipe piece contains a circumferential groove have a width such that the pipe piece forms a collar-shaped flange at ends of the pipe.

12. A flow rate measuring arrangement having the flow rate measuring cell as claimed in claim 7, wherein the pipe-shaped carrier part is formed at both ends of the pipe-shaped carrier part for installation in a pipeline which guides the fluid.

\* \* \* \* \*